WITNESSES:
Bernard R. Giegerich
Leon M. Garman

INVENTOR
Terry A. Jeeves
BY Dean Schron
ATTORNEY

May 23, 1967 T. A. JEEVES 3,321,611
LOGIC CIRCUITRY FOR BINARY FULL ADDER EMPLOYING
MULTI-ELEMENT DIODE STRIPS
Filed Aug. 31, 1964
3 Sheets-Sheet 3

United States Patent Office 3,321,611
Patented May 23, 1967

3,321,611

LOGIC CIRCUITRY FOR BINARY FULL ADDER EMPLOYING MULTI-ELEMENT DIODE STRIPS

Terry A. Jeeves, Penn Hills, Pa., assignor to Westinghouse Electric Corporation, East Pittsburgh, Pa., a corporation of Pennsylvania Filed Aug. 31, 1964, Ser. No. 393,129
6 Claims. (Cl. 235—175)

This invention in general relates to logic circuits, and more in particular, to logic circuits employing multi-element semiconductor devices.

Multi-element semiconductor devices are generally a mass produced, or production line product wherein one semiconductor device has incorporated therein a plurality of semiconductor circuit elements. One such device is described and claimed in Patent 3,106,764 by S. Longini, the assignee of which is the same as in the present invention. One type of semiconductor device is a multi-diode strip having an elongated member of first type semiconductivity with a plurality of doped regions thereon of opposite type semiconductivity each doped region constituting a first electrode and the semiconductor member constituting a second electrode, of a diode element, with the second electrode member being common to all of the individual first electrodes.

For use in circuit applications, the diode strip may be scored and broken to thereby obtain individual diodes or a diode strip incorporating a plurality of doped regions may be utilized as a multi-input AND gate or a multi-input OR gate. When utilized as a multi-input gating device, proper biasing means are applied to the common electrode member, and an output signal is obtained from an output lead means connected to the said member. For many types of logic circuitry employing both AND and OR gates, it is often necessary to score and break off individual or several diodes from a diode strip significantly adding to the time and complexity involved in the construction of particular circuits.

It is therefore an object of the present invention to provide circuitry utilizing a multi-diode device for performing both the AND and OR function.

A further object of the present invention is to provide logic circuitry utilizing multi-element semiconductor devices interconnected to perform a plurality of logic functions.

A further object is to provide logic circuitry employing multi-element diode strips constructed and arranged to lessen the time for assemlage of the circuits.

Briefly, the invention comprises the utilization of a muti-element semiconductor device having a plurality of doped regions on a semiconductor member, with each doped region constituting a first electrode and the semiconductor member constituting a second electrode, common to all the first electrodes. The common second electrode is biased with a voltage of a predetermined polarity and at least one of the first electrodes is biased with a voltage of an opposite polarity. A plurality of devices incorporating the dual biasing concept may be provided for performing logic functions and wherein at least one lead connected to first electrodes of different semiconductor devices are electrically connected to each other, specific connections allowing a plurality of binary functions to be performed.

For a better understanding of the present invention together with further objects and advantages, reference should be made to the following detailed specification taken in conjunction with the drawings, in which.

Figure 1:
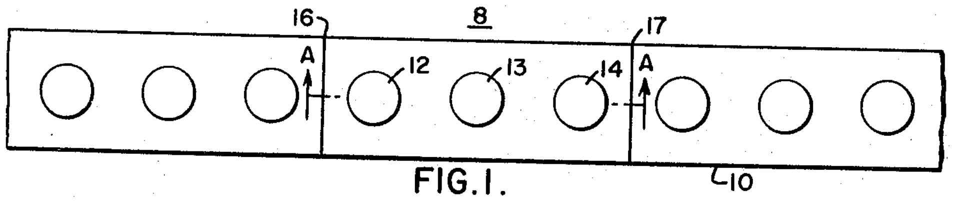
FIGURE 1 illustrates in plan view a multi-element semiconductor device.

Referring now to FIG. 1, there is illustrated a multi-element semiconductor device in the form of diode strip 8 comprising an elongated strip 10 of a first type semiconductivity. Onto the top surface of member 10 are a plurality of doped regions, such as 12, 13, 14, of opposite type conductivity, the device of FIG. 1 being more fully explained in the aforementioned patent. The strip may be scored after individual doped regions to thereby obtain individual diodes, or it may be scored such as along lines 16 and 17 to obtain a smaller sub-unit, and to this end reference should be made to FIG. 2.

Figure 2:
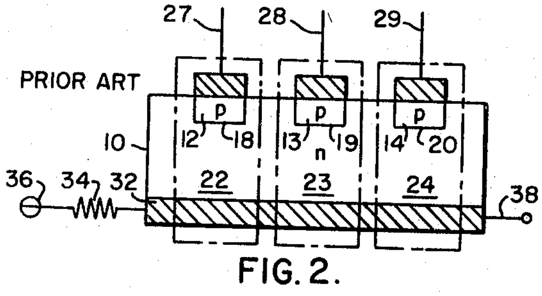
FIG. 2 illustrates, partially in section, the device of FIG. 1 utilized in a prior art configuration.
Figure 2A:
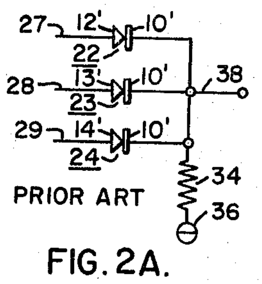
FIG. 2A illustrates the diode equivalent of FIG. 2.

In FIG. 2 there is illustrated, in side view, that portion of FIG. 1 along view A—A from lines 16 to 17. The semiconductor member 10 in conjunction with the doped region 12 forms a p-n rectifying junction 18 with the doped region 12 constituting a first electrode and the semiconductor member 10 constituting a second electrode of a semiconductor circuit element, the element being diode 22. For purposes of illustration the semiconductor member 10 may be of n-type conductivity and the doped regions thereon may be of p-type conductivity. In a similar fashion with respect to diode 22, diode 23 comprises doped region 13 constituting a first electrode and the semiconductor member 10 constituting a second electrode with a p-n junction 19 therebetween, and diode element 24 is formed of doped region 14 constituting a first electrode with the semiconductor member 10 constituting a second electrode and a rectifying p-n junction 20 therebetween. Input leads 27, 28 and 29 are ohmically connected to first electrodes 12, 13 and 14 respectively. The semiconductor member 10 has on the bottom surface thereof ohmic contact means 32 to which a source of biasing voltage 36 is applied through resistor 34. Output lead means 38 are affixed to the ohmic contact means 32 for deriving output signals in response to input signals on the input lead means 27, 28 and 29. With the conductivity of the members as above stated, each of the doped regions 12, 13 and 14 constitute an anode electrode and semiconductor member 10 constitutes a unitary cathode electrode common to all the anode electrodes. In FIG. 2A there is shown the conventional circuit equivalent of the structure shown in FIG. 2. FIG. 2A shows the plurality of diodes 22, 23 and 24 with associated electrodes being numbered in correspondence with those of FIG. 2; that is, 12′ represents the doped region 12, 13′ represents the doped region 13, 14′ represents the doped region 14 and each of the cathodes of FIG. 2A labeled 10′ represent the unitary semiconductor member 10. Other leads and biasing means are identical to that of FIG. 2. It will be recognized that the circuit of FIG. 2A, and consequently the structure of FIG. 2, is a conventional binary gating circuit wherein if some positive voltage represents a binary ONE and some lesser positive, or negative voltage represents a binary ZERO, then the circuit shown is an OR gate. If negative logic is utilized, that is, where a binary ONE signal is represented by some negative voltage and a binary ZERO represented by some relatively higher voltage such as ground, then the circuit is an AND gate. In the prior art circuitry the multi-element semiconductor device has lead and biasing means connected thereto such that each of the doped regions constituting first electrodes all have means for receiving input signals. The present invention utilizes the common multi-element semiconductor device as shown in FIGS. 1 and 2 in a novel manner and to this end reference is made to FIG. 3.

Figure 3:
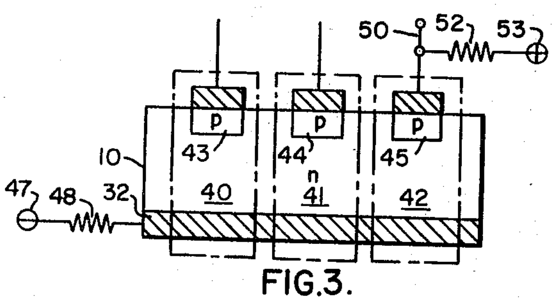
FIG. 3 illustrates the utilization of the device of FIG. 1 in accordance with the present invention.
Figure 3A:
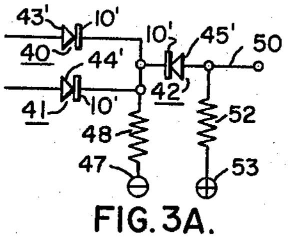
FIG. 3A illustrates the diode equivalent of FIG. 3.

The structure of FIG. 3 includes semiconductor member 10 and a plurality of first electrodes 43, 44 and 45. For purposes of explanation herein it will be assumed that the doped regions are of p-type conductivity to form anode electrodes and the semiconductor member 10 of n-type forming a common cathode electrode and any operation will be described assuming that negative logic is utilized, that is, a binary ONE is represented by some voltage more negative than a binary ZERO. The semiconductor member 10 of FIG. 3 includes ohmic contact means 32 and a source of negative bias voltage 47 connected to the ohmic contact means 32 through resistor 48. Anodes 43 and 44 are operative to receive input signals. To anode 45 there is connected output lead means 50, and to properly bias the connected output lead means 50, and to properly bias the anode 45, there is provided biasing means including resistor 52 which is connected to a suitable source of voltage 53, the polarity of which is opposite to that of the voltage source 47. The equivalent diode circuit is shown conventionally in FIG. 3A and it is seen that diodes 40 and 41 constitute a two input AND gate suitably biased through resistor 48 and diode 42 suitably biased through resistor 52 with biasing means of opposite polarity constitutes one input of an OR gate.

Figure 4:
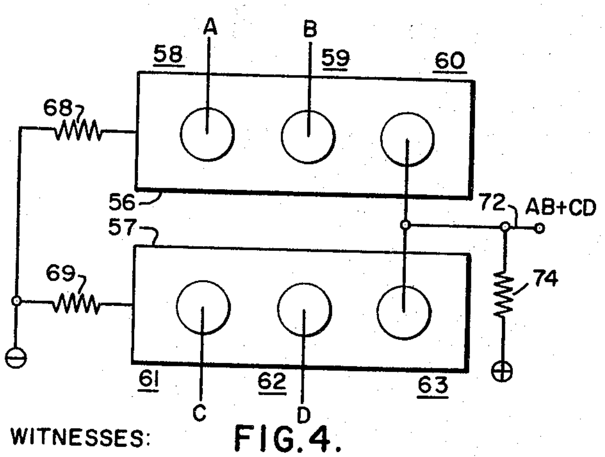
FIG. 4 illustrates a circuit arrangement in accordance with the present invention.
Figure 4A:
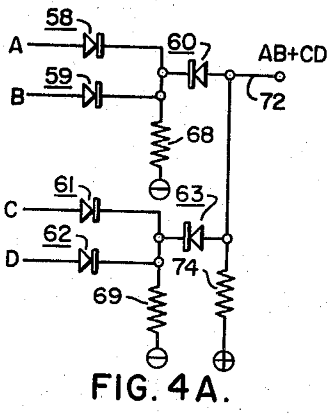
FIG. 4A illustrates the diode equivalent of the circuit of FIG. 4.

FIG. 4 illustrates a typical logic circuit incorporating the principles of the present invention and wherein an output signal is obtained only if the input signals A and B are both present or the input signals C and D are both present, the function being $X=AB+CD$. The circuit arrangement for performing this function includes semiconductor devices 56 and 57. A plurality of diodes 58, 59 and 60 are provided by semiconductor device 56, and diodes 61, 62 and 63 are provided by semiconductor device 57. FIG. 4A shows the diode equivalent of the circuit of FIG. 4. The unitary cathode member of diodes 58, 59 and 60 is connected to a source of suitable biasing potential through resistor 68 and the unitary cathode member of diodes 61, 62 and 63 is similarly connected to the said source of bias potential through resistor 69. Diodes 58 and 69 constituting a 2-input AND gate have applied to the anodes thereof input signals A and B respectively, and diodes 61 and 62 constituting a 2-input AND gate have applied to the anodes thereof input signals C and D respectively. Output lead means 72 is operatively connected to both of the anodes of diodes 60 and 63, which are properly biased by the operative connection of the output lead means 72 through resistor 74 to a source of positive potential thereby defining a 2-input OR gate.

Figure 5:
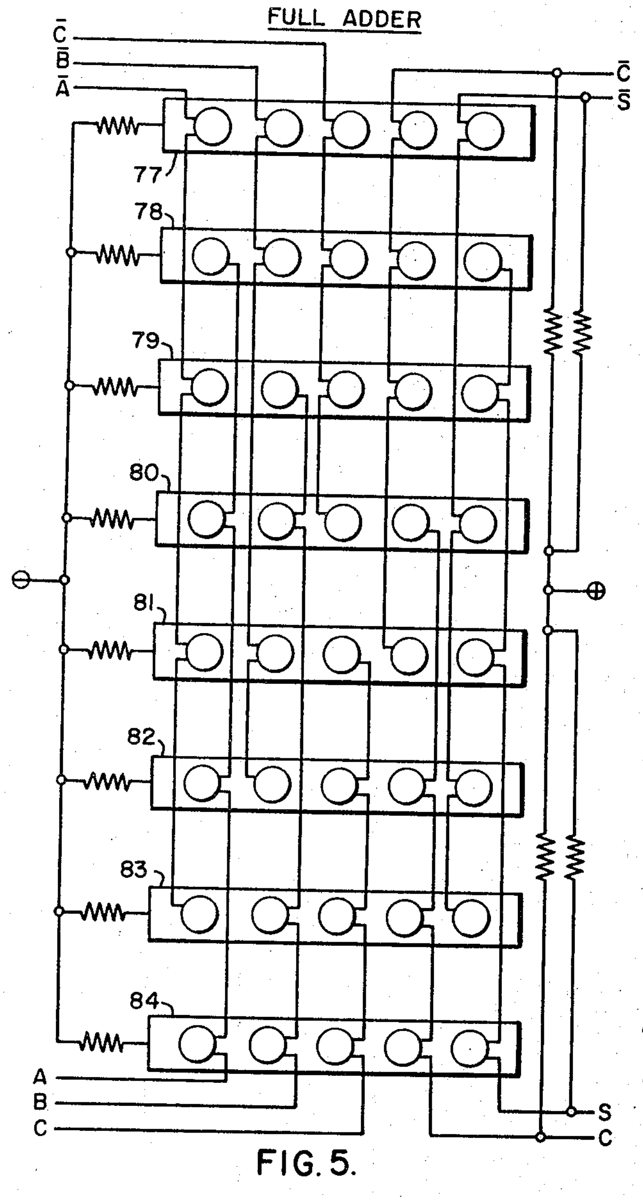
FIG. 5 illustrates a full adder in accordance with the present invention.
Figure 5A:
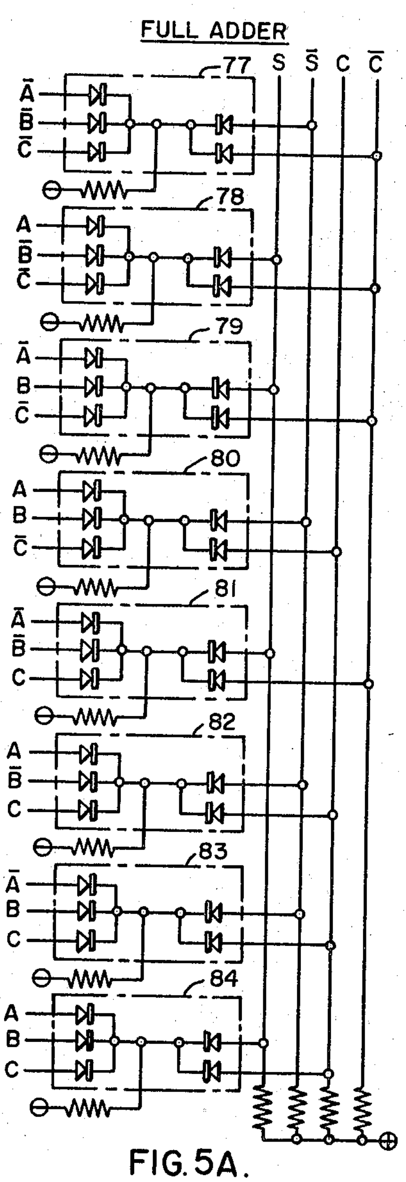
FIG. 5A illustrates a diode equivalent of FIG. 5.
Figure 6:
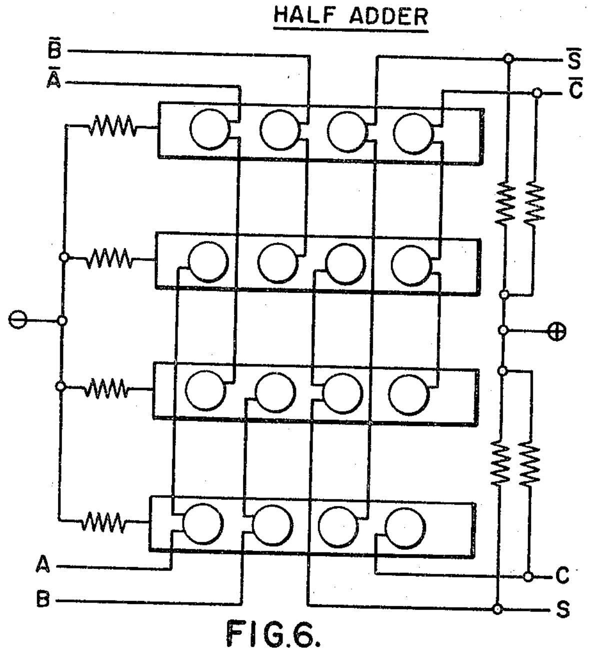
FIG. 6 illustrates another logic circuit in accordance with the present invention.

FIG. 5 illustrates another circuit in accordance with the present invention wherein a plurality of input lead means is connected in combinatorial fashion to predetermined ones of the various anodes and output lead means are connected to predetermined others of the anodes for performing a full addition function. The full adder of FIG. 6 includes a plurality of semiconductor devices 77 to 84 each having five diodes formed thereon. The cathodes of these semiconductor devices are resistively connected to a source of negative potential as heretofore explained and the output lead means designated S and C, and their complements $\overline{S}$ and $\overline{C}$ are resistively connected to a suitable source of positive potential. The full adder of FIG. 6 is operable to receive a first input signal A indicative of a fisrt operand (addend), a second input signal B, indicative of a second operand (augend) and a third input signal C indicative of a carry from a previous operation. The first three anodes of semiconductor device 84 receives these three input signals and the last two anodes of semiconductor device 84 has output lead means connected thereto for providing a sum signal S and a carry signal C for subsequent operation. The complements of the input signals, namely, $\overline{A}$, $\overline{B}$, and $\overline{C}$, are received by the first three anodes of the semiconductor device 77, the remaining two anodes of which have output lead means connected thereto for providing the complements of the sum and carry signal that is, a $\overline{\text{sum}}$ and $\overline{\text{carry}}$ ($\overline{S}$ and $\overline{C}$) output signal. Intermediate semiconductor devices 77 and 84, unique combinations of the input signals are respectively applied to the anode electrodes of the various semiconductor devices, best seen in FIG. 5A, illustrating the equivalent diode circuitry of the full adder shown in FIG. 5. In FIG. 5A the corresponding semiconductor devices incorporating the various diodes of FIG. 5 are shown in dotted outline. In logic systems employing full adders wherein the complements of the sum and carry signals are not required, it is obvious that the logic circuit of FIG. 5 can be modified to solely provide the sum and carry signals S and C respectively. The circuit of FIG. 5 constructed and arranged in accordance with the teachings of the present invention finds particular use in multiplier circuits wherein thousands of diodes must be utilized. Not only is the assemblage of the adder circuit facilitated, but in addition there results a neatly arranged and compact logic circuit which may be spatially arranged in desired orientations with other logic circuits.

Figure 6A:
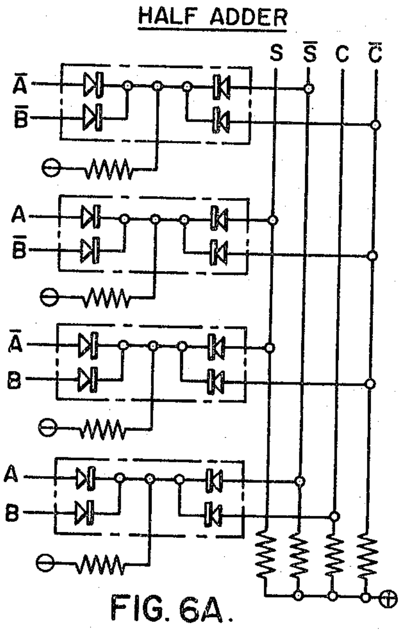
FIG. 6A represents the diode equivalent of FIG. 6.

Other arrangements incorporating the semiconductor devices such as the half adder circuit shown in FIG. 6 (its equivalent diode circuit being shown in FIG. 6A) may be constructed and arranged in accordance with the present invention for providing the various other logic functions.

Although the present invention has been described with a certain degree of particularity it should be understood that the present disclosure has been made by way of example and that modified forms of structures and arrangements may be utilized without departing from the scope of the present invention.

What is claimed is:

1. A logic circuit comprising:
a plurality of semiconductor devices;
each said device including a member of first type semiconductivity having a plurality of doped regions on a first surface thereof, said doped regions being of opposite type conductivity than that of said member, each said region forming a first electrode, with said member forming a common second electrode of a circuit element;
input and output lead means;
at least one of said lead means being connected to first electrodes of at least two of said semiconductor devices;
means for applying a first bias to the common second electrodes of each of said semiconductor devices; and
means for applying a second bias to said output lead means.

2. A logic circuit comprising:
a plurality of diode strips each being formed of an elongated strip of semiconductor material having a plurality of doped regions thereon, each region forming a first electrode and said strip forming a common second electrode of a diode;
a plurality of input leads each operatively connected to respective first electrodes of at least two of said strips;
output lead means operatively connected collectively to all of the remaining said first electrodes;
means for applying a first bias to said second electrode of each of said strips; and means for applying a second and opposite bias to said output lead means.

3. A logic circuit comprising:

a plurality of semiconductor devices;

each said device including a first type semiconductivity member having a top and bottom surface and having a plurality of doped regions of second type semiconductivity at said top surface, and ohmic contact means on said bottom surface;

each said region forming with said member a semiconductor circuit element, with each said region constituting a first electrode and said member constituting a second electrode common to all said first electrodes;

means for applying a first bias voltage to said ohmic contact means of each of said semiconductor devices;

a plurality of input lead means connected in combinatorial fashion to predetermined ones of said first electrodes;

output lead means connected to predetermined others of said first electrodes; and means for applying a second bias voltage opposite in polarity to said first bias voltage to said latter named electrodes.

4. A logic circuit comprising:

a plurality of semiconductor devices;

each said device including a first type semiconductivity member having a top and bottom surface and having a plurality of doped regions of second type semiconductivity at said top surface, and ohmic contact means on said bottom surface;

each said region forming with said member a semiconductor circuit element, with each said region constituting a first electrode and said member constituting a second electrode common to all said first electrodes;

a first source of potential of first polarity;

a second source of potential of opposite polarity;

means resistively connecting the ohmic contact means of each said semiconductor devices to said first source of potential;

a plurality of input leads connected to a portion, less than the total, of said first electrodes;

output lead means connected to the remaining said first electrodes; and means resistively connecting said remaining first electrodes to said second source of potential.

5. A full adder comprising:

a plurality of semiconductor devices each comprising a semiconductor member having a plurality of doped regions on a first surface thereof, each region forming a diode element with said semiconductor member;

a plurality of input leads for receiving binary input signals indicative of a first operand, a second operand, a carry, and their complements;

means connecting said input leads to said doped regions in a manner such that three regions of each said devices receive a unique combination of different ones of said input signals;

means for applying a first bias to said semiconductor member;

output lead means including a sum and carry output lead connected to doped regions of predetermined ones of said semiconductor devices; and means for applying a bias to said doped regions of the semiconductor members to which said output lead means are connected.

6. A full adder comprising:

eight semiconductor devices each comprising a semiconductor member having five doped regions on a first surface thereof, each region forming a first electrode and said member forming a common second electrode of a semiconductor diode element;

six input leads for receiving, respectively, an A signal indicative of a first operand, an $\overline{A}$ signal indicative of its complement, a B signal indicative of a second operand, a $\overline{B}$ signal indicative of its complement, a C signal indicative of a carry, and a $\overline{C}$ signal indicative of its complement;

means connecting said input leads to said devices such that said $\overline{A}\overline{B}\overline{C}$ signals are respectively applied to three first electrodes of a first of said devices, $\overline{A}\overline{B}C$ signals are respectively applied to three first electrodes of a second of said devices, $\overline{A}B\overline{C}$ signals are respectively applied to three first electrodes of a third of said devices, $\overline{A}BC$ signals are respectively applied to three first electrodes of a fourth of said devices, $A\overline{B}\overline{C}$ signals are respectively applied to three first electrodes of a fifth of said devices, $A\overline{B}C$ signals are respectively applied to three first electrodes of a sixth of said devices, $AB\overline{C}$ signals are respectively applied to three first electrodes of a seventh of said devices, ABC signals are respectively applied to three first electrodes of an eighth of said devices;

a sum output lead connected to a fourth electrode of said second, third, fifth and eighth devices;

a $\overline{\text{sum}}$ output lead connected to a fourth electrode of said first, fourth, sixth and seventh devices;

a carry output lead connected to a fifth electrode of said fourth, sixth, seventh and eighth devices;

a $\overline{\text{carry}}$ output lead connected to a fifth electrode of said first, second, third and fifth devices; and means for applying a bias to said common second electrode of each of said semiconductor devices; and means for applying a bias of opposite polarity to said output leads.

References Cited by the Examiner

UNITED STATES PATENTS

| | | | |
|---|---|---|---|
| 3,005,937 | 10/1961 | Wallmark et al. | 317—235 |
| 3,100,838 | 8/1963 | Szekely | 235—176 |

MALCOLM A. MORRISON, *Primary Examiner.*

M. P. HARTMAN, *Assistant Examiner.*